United States Patent
Gathala et al.

(10) Patent No.: US 12,411,741 B1
(45) Date of Patent: Sep. 9, 2025

(54) TECHNIQUES FOR TRACKING AND SECURING SENSITIVE DATA IN DISTRIBUTED STORAGE NETWORKS

(71) Applicant: Amazon Technologies, Inc., Seattle, WA (US)

(72) Inventors: Anil Gathala, San Jose, CA (US); Sandeep Kumar, Sammamish, WA (US); Chakravarthi Kalyana Valicherla, Redmond, WA (US); Shlomo Yehezkel, West Hills, CA (US); Peter Ferrie, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 58 days.

(21) Appl. No.: 18/345,337

(22) Filed: Jun. 30, 2023

(51) Int. Cl.
*G06F 16/00* (2019.01)
*G06F 11/14* (2006.01)

(52) U.S. Cl.
CPC ...... *G06F 11/1469* (2013.01); *G06F 2201/84* (2013.01)

(58) Field of Classification Search
CPC .................. G06F 11/1469; G06F 2201/84
See application file for complete search history.

(56) References Cited

U.S. PATENT DOCUMENTS

| | | | |
|---|---|---|---|
| 6,859,455 B1 | 2/2005 | Yazdani et al. | |
| 10,025,878 B1 * | 7/2018 | Lefever | G06F 16/9024 |
| 11,301,462 B1 * | 4/2022 | Dye | G06F 16/2365 |
| 2003/0204515 A1 | 10/2003 | Shadmon et al. | |
| 2009/0037672 A1 * | 2/2009 | Colbert | G06F 9/5077 |
| | | | 711/E12.001 |
| 2017/0293754 A1 * | 10/2017 | Jung | G06F 21/52 |
| 2017/0344409 A1 * | 11/2017 | Haber | G06Q 40/12 |
| 2018/0137017 A1 * | 5/2018 | Brown | G06F 11/1448 |

\* cited by examiner

*Primary Examiner* — Dinku W Gebresenbet
(74) *Attorney, Agent, or Firm* — Knobbe, Martens, Olson & Bear, LLP

(57) ABSTRACT

Systems and methods are provided for tracking sensitive data within a plurality of storage units, where storage units include block storage volume(s) and/or "snapshot(s)" representing values of every block of a block storage volume or device at a particular point in time. A computing device may be configured to receive a notification identifying a first tainted storage unit. Subsequently, a subset of the plurality of storage units may be identified. Additional tainted storage units can be identified as tainted within the subset. This identification may depend on whether the storage units contain data blocks in common with the first tainted storage unit. Remedial action may be taken for storage units identified as tainted.

20 Claims, 11 Drawing Sheets

TECHNIQUES FOR TRACKING AND SECURING SENSITIVE DATA IN DISTRIBUTED STORAGE NETWORKS

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

When computing resources are used by or at the direction of a user, data may be loaded, generated, modified, or the like. The data may be stored for access by additional computing resources and/or at later times. Stored data may be duplicated throughout the computing resources.

DETAILED DESCRIPTION

Figure 1:
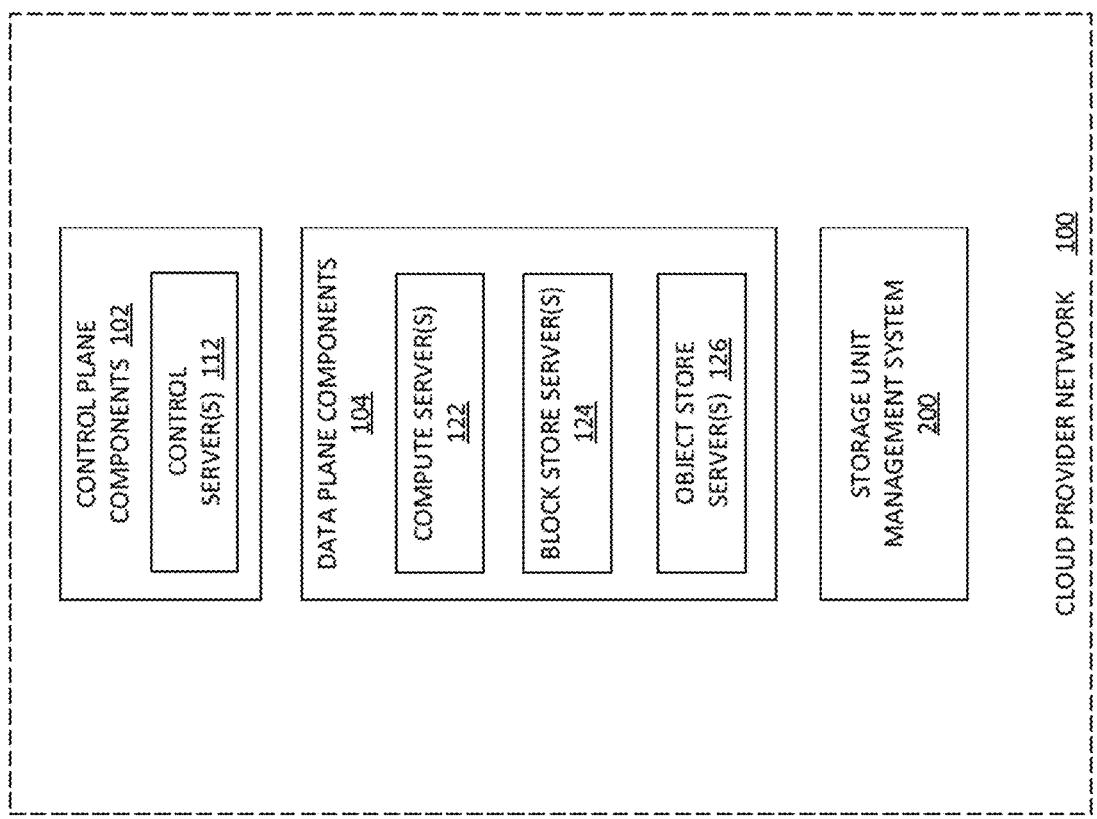
FIG. 1 is a block diagram of an example cloud provider network.

Generally described, the present disclosure relates to tracking the distribution of sensitive data across network-based computing resources, and then using this tracked distribution for data security use cases such as malware detection or detection of mis-stored sensitive information. Regarding malware detection, according to existing technology, customers of a provider network such as a cloud provider network can run event-driven or periodic (ex: daily/weekly/monthly) malware scan agents to detect any infected files in their hosted storage (ex: block store volumes, object store buckets), or else they can insert traditional anti-malware/virus software onto their compute environments (ex: virtual machine instances, containers, serverless functions) to regularly scan the associated storage (ex: volume(s) attached to an instance). While these techniques can successfully scan and evaluate individual volumes or other storage resources separately, they cannot offer insights as to how widely the infection may have spread through the customer's hosted infrastructure. The data security systems of the present disclosure address this challenge, among others, by enabling assessment of the spread of detected malware/viruses or other security vulnerabilities across related resources. For example, starting with a volume that is known to be malware infected, the disclosed data security system can determine in the snapshot lineage of that volume what is the list of all infected snapshots, as depending on when the volume was infected not all snapshots out of that volume may include the malware. This can enable remediation of security issues at other resources that are using or have used the affected snapshots. Additional detail about incremental snapshots and snapshot lineages is provided below.

Regarding mis-stored information, customers can store sensitive information on their volumes but sometimes the volumes may not be encrypted. When a sensitive file gets on to a volume by accident, the account administrator may delete the file from the volume and consider that the 'privacy leak' of the sensitive information is contained. However, customers may have their own automation scripts, or services such as a data life cycle manager (DLM) service or backup service, which automatically create snapshots of these volumes at specified points. This means the sensitive data may have leaked into snapshots and thereby into further volumes, which are created from snapshots. Existing technologies do not provide customers a way of finding out the list of all volumes and snapshots that contain a given piece of sensitive information. Having such a facility can help customers to detect and completely cleanup the leaked sensitive data.

Although the above examples refer to storage resources that contain sensitive or dangerous data, the disclosed data security systems can also identify and remediate affected compute resources. For example, virtual machine instances can be created from snapshots and may be determined to be affected as described herein. In another example, an inspection service can scan virtual machine instances to detect software vulnerabilities. Once vulnerable instances are identified, their corresponding volumes can be marked as tainted. To further determine/detect the extent vulnerabilities in their account, the disclosed data security systems provide a way to find out all snapshots and volumes where these vulnerabilities have spread. Rather than scanning every instance, the disclosed techniques provide an API which can be queried and return the extent of spread, for example in the form of list of snapshots. Such snapshots may be deleted and any compute resource created from those snapshots can be remediated, for example by being rolled back to a state that was saved prior to introduction of the sensitive data.

In general, data stored for use by network-based computing resources may be stored as a one or more storage units. A storage unit may be a block storage volume used by an active compute instance, and/or a "snapshot" representing values of every block of a block storage volume or device at a particular point in time and stored for backup or future reuse.

In certain cases, or under certain circumstances, it may be necessary or desirable to identify storage units containing sensitive data. Sensitive data may include, but is not limited to, malware or other unwanted software, data that exposes computing resources to vulnerabilities, confidential data, personally-identifiable information (PII), other unwanted data, or other data of interest. A storage unit on which such sensitive data is stored may be referred to as a tainted storage unit.

Some conventional systems may scan storage units for sensitive data. However, these scans may be limited in the types of storage units that they can search. For example, some systems may scan block storage volumes in use by active compute instances and return a list of volumes that contain sensitive data. Some conventional systems may scan previously-saved data objects, such as snapshots, and return a list of objects that contain sensitive data. In addition, these scans may be time-consuming because they require each storage unit to be evaluated separately. Furthermore, conventional systems and scans do not offer insights into how the sensitive data has spread throughout the network computing resources. For example, returning a list of volumes containing sensitive data does not provide information on what snapshots created from the volumes may also contain the sensitive data. This can be important in managing further actions taken on sensitive data (e.g., quarantine, deletion, etc.) in order to prevent future restoration of snapshots that include the sensitive data. Moreover, even if every storage unit is scanned and all storage units with sensitive data are identified at the time each is scanned, the total time and computing resources required to do so in a large dynamic network computing environment may inhibit containing the spread of sensitive data or may not otherwise be practical or possible.

With reference to an illustrative example, sensitive data may be introduced to a volume actively being used by a compute instance, thus rendering the volume a tainted volume. A user may decide to delete sensitive data, or the taint of the volume may otherwise be mitigated (e.g., due to scanning of active volume). However, the sensitive data may have been duplicated into other storage units prior to mitigation of the tainted source volume. For example, snapshots may be taken automatically at regular intervals or in response to events (e.g., by a backup utility), and volumes may also be automatically generated from these snapshots. These storage units may still contain the sensitive data that the user wanted to delete or may have already deleted.

Some aspects of the present disclosure address the issues above, among others by creating a storage unit lineage graph to represent relationships among—or otherwise store relationship data associated with—the storage units (e.g., parent/child relationships). The storage unit lineage graph (also referred to herein as a "graph data structure" or simply as a "graph" for brevity) may be created automatically after an event (e.g., a request from an external service, a request from a user, etc.). The related storage units may be associated with one or more user accounts, as will be discussed in more detail below. Graphs may store identification information for storage units as nodes and relationships between the storage units as edges. Storing this information within graphs provides a streamlined framework to guide searches for sensitive data storage units. Use of graphs allows sensitive data to be found in multiple types of storage units. Graphs could store relationship data between block storage volumes (also referred to as "data volumes" or as "volumes" for brevity), snapshots of those volumes, volumes restored ("rehydrated") from those snapshots, duplicate snapshots (e.g., snapshots containing the same data blocks as snapshots they depend from), incremental snapshots (e.g., snapshots containing data blocks not present in snapshots they depend from), other types of relationships, or some combination thereof. Moreover, this method mitigates the need to search every storage unit to find sensitive data storage units. Instead, given a tainted storage unit, the search can start with the tainted storage unit. Using the graph, the search could proceed in a limited manner to related storage units identified in the graph as being associated with that storage unit. The search may be expanded to other nodes and branches of the graph based on the relationships between the nodes (and therefore based on the lineage relationships between the storage units), until all tainted storage units are found.

The storage unit lineage-based approach also allows for additional controls to be set to manage the size of the search space (e.g., to reduce or minimize the number of storage units evaluated during a scan). For example, in some aspects, a scan for storage units that include sensitive data could also be limited by the hierarchy of relationships within the graph. A tainted storage unit could be associated with a node in the middle of a graph. Storage units associated with lower nodes may have been created later in time than the tainted node. Storage units associated with upper nodes may have been created earlier in time. A scan could be limited, for example, to storage units associated with nodes lower in the graph than the tainted unit. Additionally, or alternatively, the scan could be limited to storage units created within a certain time range (e.g., based on a time at which the sensitive information is known or suspected of first being stored on a storage unit).

In some aspects, each storage unit may be associated with an ID added at the time of creation. The ID could be shared between storage units in the same lineage. For example, block storage volumes, snapshots of those volumes, and volumes restored ("rehydrated") from those snapshots could all share the same ID. In this context, the shared ID may be known as a family ID. Instead of using a graph, a scan could be limited to storage units associated with the same family ID. In some aspects, after initial relationships are established using family ID, a graph could be built in the manner described above.

Additional aspects of the present disclosure relate to further narrowing the search space by identifying data blocks with the sensitive data. In some aspects, for example, where storage units associated with sensitive data are known, these can be used to identify data blocks with tainted sensitive data. This may advantageously allow the scan to be limited to storage units containing data blocks in common with a tainted storage unit. In some embodiments, a scan may identify additional storage units as tainted if they have one or more tainted data blocks in common with the tainted storage unit.

Further aspects of the present disclosure relate to saving scan history to reduce the search space for future scans. Storage units identified as containing sensitive data may be marked as such and additionally associated with an identifier of the scan. These identifiers can be used as controls to include/exclude storage units marked as tainted from additional searches. However, if it is decided at a later point that the suspected sensitive data evaluated in the scan is no longer of interest (e.g., there was a false positive classification of data as sensitive), scan identification may be used to find and update the marking of previously tainted storage units.

Additional aspects relate to actions taken subsequent to identifying tainted storage units. Actions could include, updating the tainted storage units to reduce access. Updating the tainted storage units to reduce access could include quarantining the storage units, preventing duplication of the storage units, deleting the storage units (e.g., overwriting the storage units with zeros, removing links to the data contained within the storage unit, etc.), another action, or some combination thereof. Tainted storage blocks may also be updated to reduce access, as described above. In further aspects, a level of interest indicator may be assigned to a storage unit based at least in part on the amount or type of sensitive data found in the storage unit. For example, in some aspects, a "high" severity indicator may be assigned to a storage unit including a certain amount or a certain type of sensitive data. What actions are taken with these files (e.g., addition of additional identifiers, quarantine, deletion, etc.) may depend on the level of interest indicator assigned to the storage unit.

Various aspects of the disclosure will now be described with regard to certain examples and embodiments, which are intended to illustrate but not limit the disclosure. Although aspects of some embodiments described in the disclosure will focus, for the purpose of illustration, on particular examples of data tracking methods, data storage structures, and the like, the examples are illustrative only and are not intended to be limiting. In some embodiments, the techniques described herein may be applied to additional or alternative data tracking methods, data storage structures, and the like.

Overview of Example Computing Environment

With reference to an illustrative embodiment, FIG. 1 shows an example cloud provider network 100 in which various features for analysis and remediation of tainted storage unit, as described in the present disclosure, may be implemented. The cloud provider network 100 may also be referred to as a cloud provider network substrate, a provider network, a cloud provider system, or simply as a "cloud" for convenience.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of CPUs and GPUs, optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface (API) refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

A cloud provider network 100 can be formed as a number of regions, where a region is a separate geographical area in which the cloud provider clusters data centers. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network). Transit Centers (TC) are the primary backbone locations linking customers to the cloud provider network and may be co-located at other network provider facilities (e.g., Internet service providers, telecommunications providers). Each region can operate two TCs for redundancy.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be isolated from the rest of the cloud provider network 100, for example, it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control plane servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes customer resources that are implemented on the cloud provider network 100 (e.g., computing instances, containers, block storage volumes, databases, file storage, etc., as described in greater detail below). Data plane traffic generally includes non-administrative operations such as transferring data to and from the customer resources.

The control plane components 102 are typically implemented on a separate set of servers from the data plane components 104, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more customers. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block store servers 124, which can include persistent storage for storing volumes of customer data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary replica (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 100. The object storage servers 126 include one or more servers on which data is stored as objects within resources referred to as buckets and can be used to support a managed object storage service of the cloud provider network 100. Each object typically includes the data being stored, a variable number of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that can be used to restore volumes.

In some embodiments, a snapshot is a point-in-time block-level backup of a volume, stored as a copy of data on the volume on one or more of the object storage servers 126 (e.g., as a single object or a collection of objects). However, unlike other data stored on the object storage servers 126, snapshots may not be directly accessible within object storage buckets, and instead are accessible through the API of the block store servers 124. In one example, snapshots are implemented as incremental records of data within a volume. Illustratively, when the first snapshot of a volume is taken, all blocks of the volume that contain valid data are copied as one or more objects to the object storage servers 126, and then a snapshot definition or "manifest" file is written to the object storage servers 126 that includes a record of the one or more objects, as well as the blocks of the volume to which each of the one or more objects correspond. Due to the use of incremental snapshots, when the subsequent snapshots are taken of the same volume, only the blocks that have changed since the first snapshot need to be copied to the object storage servers 126, and the manifest can be updated to point to the latest versions of each data block (or a second manifest can be created, enabling the initial manifest to remain as a record of a prior version of the volume). Duplicate snapshots, where data blocks have not changed since the first snapshot are also possible. These could contain a record of the data blocks of the first snapshot (e.g., a duplicate manifest) or include copies of the data blocks. An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume. The particular snapshots (including the initial snapshot and any subsequent incremental snapshots) that can be used to recreate a volume form the snapshot lineage of that volume. In some scenarios two different volumes created from the same snapshot lineage may diverge (ex: because they are attached to different virtual machines which write different data to them) and thus form different branches of a lineage graph showing all "child volumes" of a root "parent volume."

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. A new volume can also be created from another volume (e.g., by cloning).

Similarly, snapshots can be taken of computing resource instances to create a "machine image" of that instance stored in the object storage servers 126, and new copies of the instance can be launched from the machine image.

Users can instruct the cloud provider network 100 to create snapshots of their volumes on the block store servers 124 and store the snapshots on the object store servers 126. A snapshot can then be used to create a new volume with information matching the volume captured in the snapshot, for example providing the benefit of feeding the volume data to the new copy without impacting I/O operations at other replicas of the volume. Further, due to the greater redundancy of the object store servers 126 provided in some embodiments, such snapshots may provide a more resilient backup copy of a volume than additional copies stored on the block store servers 124. Another benefit of using a snapshot to create a new volume copy is that it may provide the ability to replicate the volume across availability zones, while the block store servers 124 may only support replication within a given availability zone.

A storage unit management system 200 may be implemented for tracking sensitive data storage units (volumes, snapshots) and determining which storage units may be tainted with sensitive data. Advantageously, the storage unit management system 200 may create a storage unit lineage graph to represent relationships among the storage units (e.g., parent/child relationships). The storage unit management system 200 may then use the storage unit lineage graph (or another representation of storage unit relationships) to determine the spread of sensitive data and implement remedial actions, as described in greater detail below. The storage unit management system 200 may be implemented on a computing device such as a server or set of servers programmed with executable instructions. Although the storage unit management system 200 is shown as being external to and separate from the data plane components 104 and control plane components 102, the example is provided for purposes of illustration only, and is not intended to be limiting or required. In some embodiments, the storage unit management system 200 or components thereof may be fully or partially included in one or both of the control plane components 102 or data plane components 104.

Example System for Managing Storage Units

Figure 2:
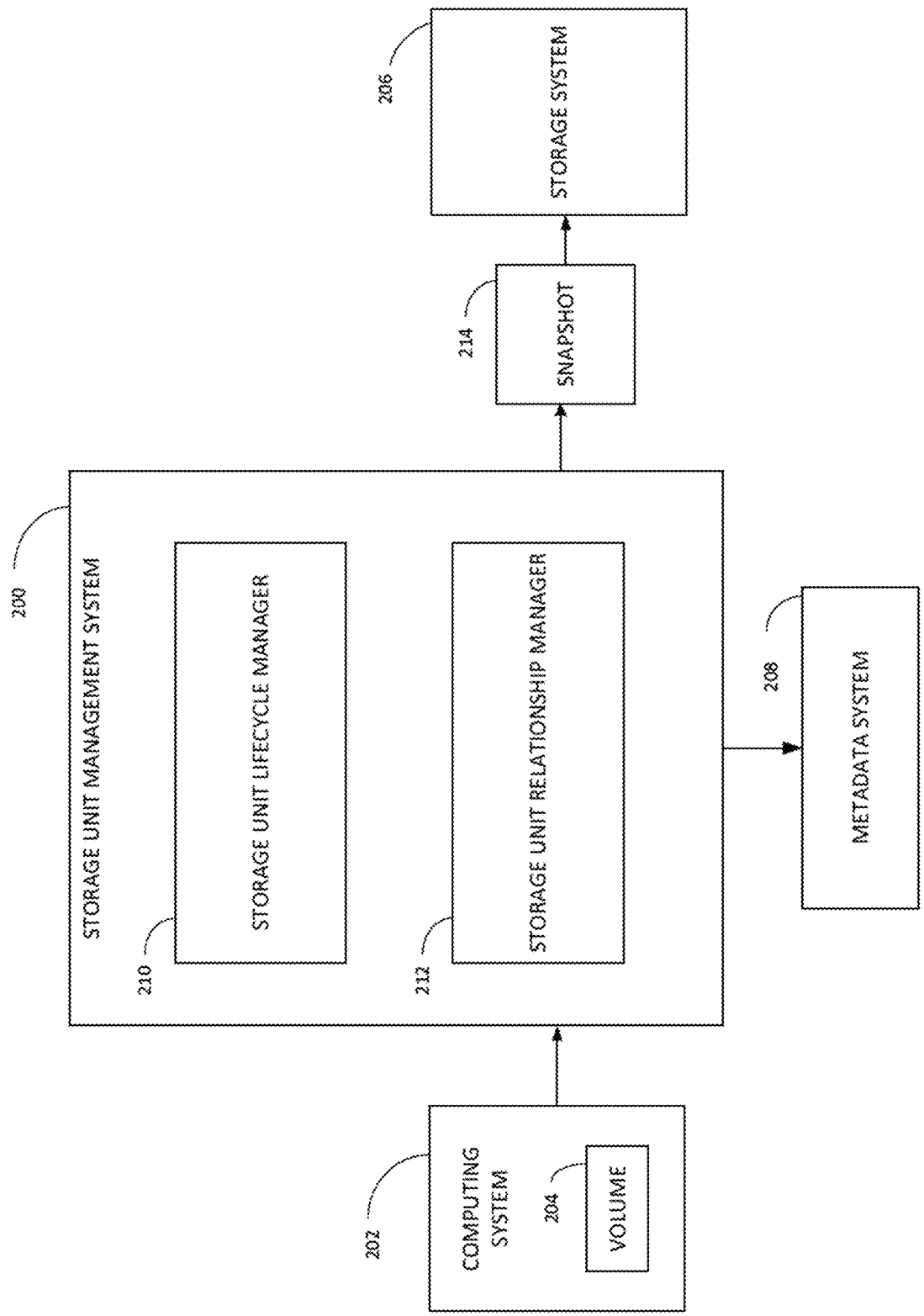
FIG. 2 is a block diagram of illustrative data flows and interactions between components of the cloud provider network during the addition and removal of storage units, according to some embodiments.

FIG. 2 shows example data flows and interactions between a storage unit management system 200, a computing system 202 that is the source of an initial data volume 204, a storage system 206 in which storage units are to be stored, and a metadata storage system 208 in which metadata relating to the storage units is to be stored. Illustratively, the example interactions and data flows occur during the addition or removal of storage units, according to some embodiments. The addition or removal of a storage unit may constitute a storage unit lineage event.

The storage unit management system 200 may include various subsystems, modules, and/or components to provide the functionality described herein. In some embodiments, the storage unit management system 200 may include a storage unit lifecycle manager 210 and a storage unit relationship manager 212.

As described above, storage units may include block storage volumes and/or snapshots. The storage unit lifecycle manager 210 may manage the addition and/or removal of one or more storage units, according to some embodiments. Removal may involve reducing the ability to access a storage unit, such as by quarantining, preventing duplication, overwriting data blocks, removing links to data contained in the storage unit, another method of removing access, or some combination thereof. For example, referring to the illustration of FIG. 2, the storage unit lifecycle manager 210 may create snapshot 214 as a representation of initial data volume 204 at a point in time. Additionally, or alternatively, control plane components (e.g., control plane components 102 of FIG. 1) may add or remove storage units.

In further embodiments, storage unit management system 200 may track the addition or removal of storage units by control plane components 102.

Every block in initial data volume 204 may contain or be assigned a unique block identifier. For example, each block may be assigned a unique block identifier such that no two blocks in the entire network (e.g., cloud provider network 100 of FIG. 1) have the same unique block identifier. The identifier may be contained in the metadata for the storage unit. Thus, any storage unit having a block with a particular unique block identifier is assured of having that same block (e.g., the same data stored in the block) as any other storage unit with a block having the same unique block identifier. For example, a particular block may be added to a volume, a snapshot of that volume may be created, and another volume may be restored from the snapshot. Each of these storage units include a collection of blocks, and the collections of blocks may be different in some respects if data been added, changed, or removed. However, if a same unique block identifier is used in each of the storage units, the underlying block data identified by the block identifier is assured of being the same.

According to some embodiments, if data within a block is modified, a new version of the block reflecting the modification may be created, and it may be assigned a new unique block identifier. This change may be reflected in later snapshots of initial data volume 204 (e.g., incremental snapshots). These unique block identifiers and data for the corresponding blocks may be stored as values in snapshot 214. Additionally, or alternatively, the metadata for snapshot 214 may include the unique block identifiers.

In some embodiments, the unique data block identifiers for multiple storage units may be compared. This comparison may be used to generate a list of storage units which share a unique data block identifier and therefore the same block of data corresponding to that unique data block identifier. In some embodiments, the comparison may indicate that more than one unique data block identifier is shared. Additionally, or alternatively, the stored values may be searched for unique block identifiers corresponding to data blocks identified as tainted with sensitive data. A list may then be returned of storage units with those data blocks.

In some embodiments, storage unit lifecycle manager 210 may also create ("rehydrate") volumes from snapshots. Storage unit lifecycle manager 210 may also create volumes from other volumes (e.g., by cloning). Storage unit lifecycle manager 210 may also create snapshots based on other snapshots, such as duplicate snapshots or incremental snapshots that include only blocks that have been added or changed in the time since creation of the base snapshot. In some embodiments, additional metadata may be generated during the creation of storage units to provide indications of relationships developed between the different storage units. These indicators may be passed to storage unit relationship manager 212 and/or metadata storage system 208. In some embodiments storage unit relationship manager 212 can retrieve indicators from metadata storage system 208. These indicators could include, but are not limited to, timestamps (e.g., for the time of creation of a storage unit), family IDs, parent pointers (e.g., pointers to storage units created earlier in time and/or storage units that a particular storage unit was created from), child pointers (e.g., pointers to storage units created later in time and/or storage units created from a particular storage unit), other data, or any combination thereof.

In some embodiments, storage unit relationship manager 212 may use these indicators to generate one or more storage unit lineage graphs ("graph(s)" for brevity), where each node in the graph may represent a storage unit and each edge in a graph may represent a relationship between the storage units. Each graph may be representative of a lineage, wherein all storage nodes associated with a lineage stem from a source volume.

Each graph may also be associated with one or more user accounts. In other words, storage units corresponding to nodes of the graph may be from the user account(s). An account may have a single set of credentials used to access the network (e.g., cloud provider network 100 of FIG. 1). A user may have more than one account. Additionally, or alternatively, there may be a set of trusted accounts, where each trusted account is able to access the data of the other trusted accounts. In some embodiments, only partial access may be granted. Different data, including storage units, may be stored in each account.

In a non-limiting embodiment, each graph may be associated with one account. In some embodiments, one account may have multiple graphs. For example, each graph may have nodes corresponding to a subset of storage units from the account. In some embodiments, there may be some overlap between these subsets.

In some embodiments, one graph may be associated with multiple accounts. In a non-limiting embodiment, for example, a storage unit of a first account may contain a set of unique block identifiers. The data blocks corresponding to these storage units and/or other metadata may be transferred to a storage unit created in the second account. Nodes in the same graph may represent both storage units. Additionally, or alternatively, both storage units may be considered part of the same lineage.

Example Storage Unit Lineage Graph Building Process

Figure 3:
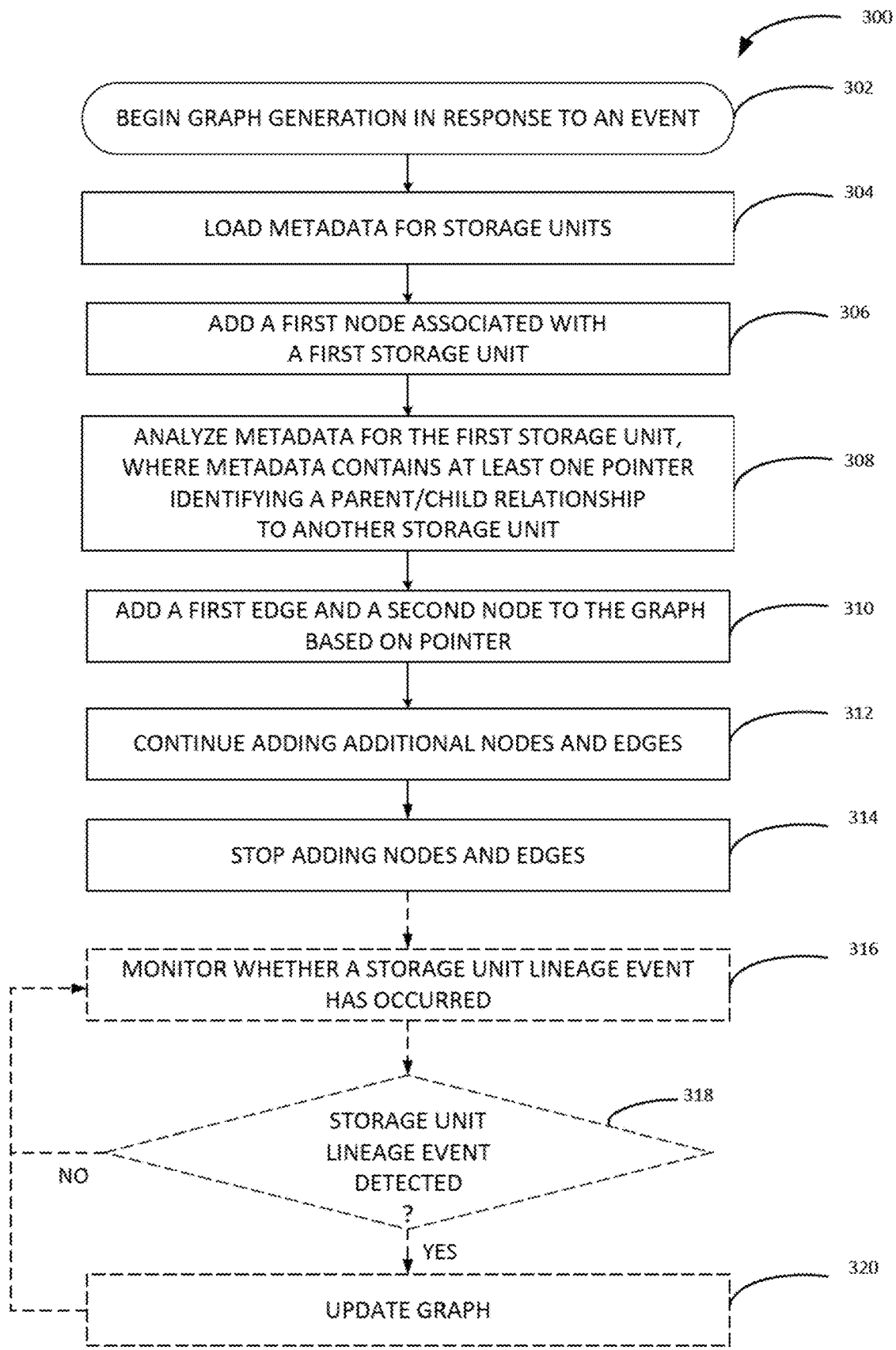
FIG. 3 is a flow diagram of an illustrative process for generating a graph associated with one or more storage units.
Figure 4:
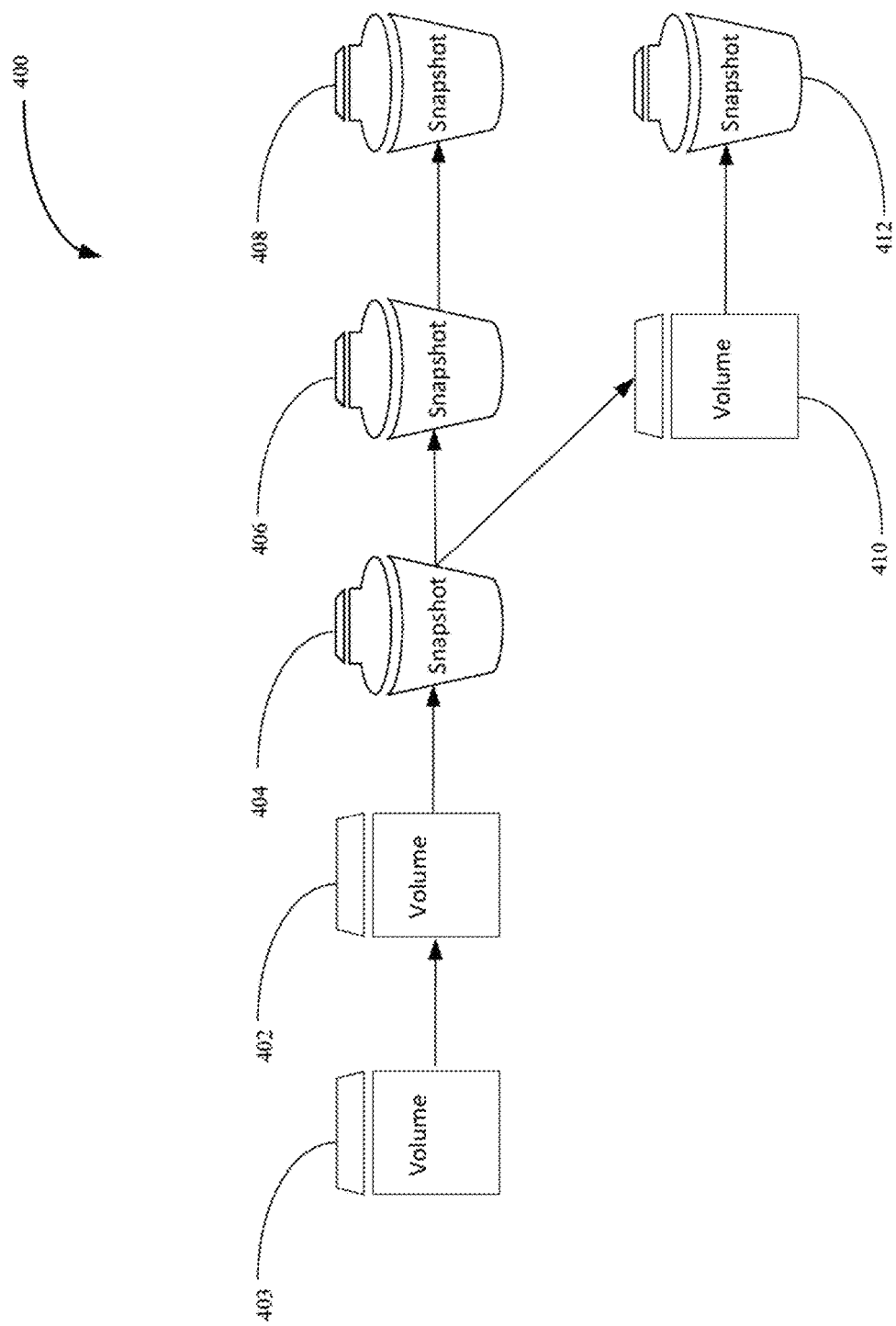
FIG. 4-5 are block diagrams of illustrative lineages of storage units showing various branches corresponding to different storage units.
Figure 5:
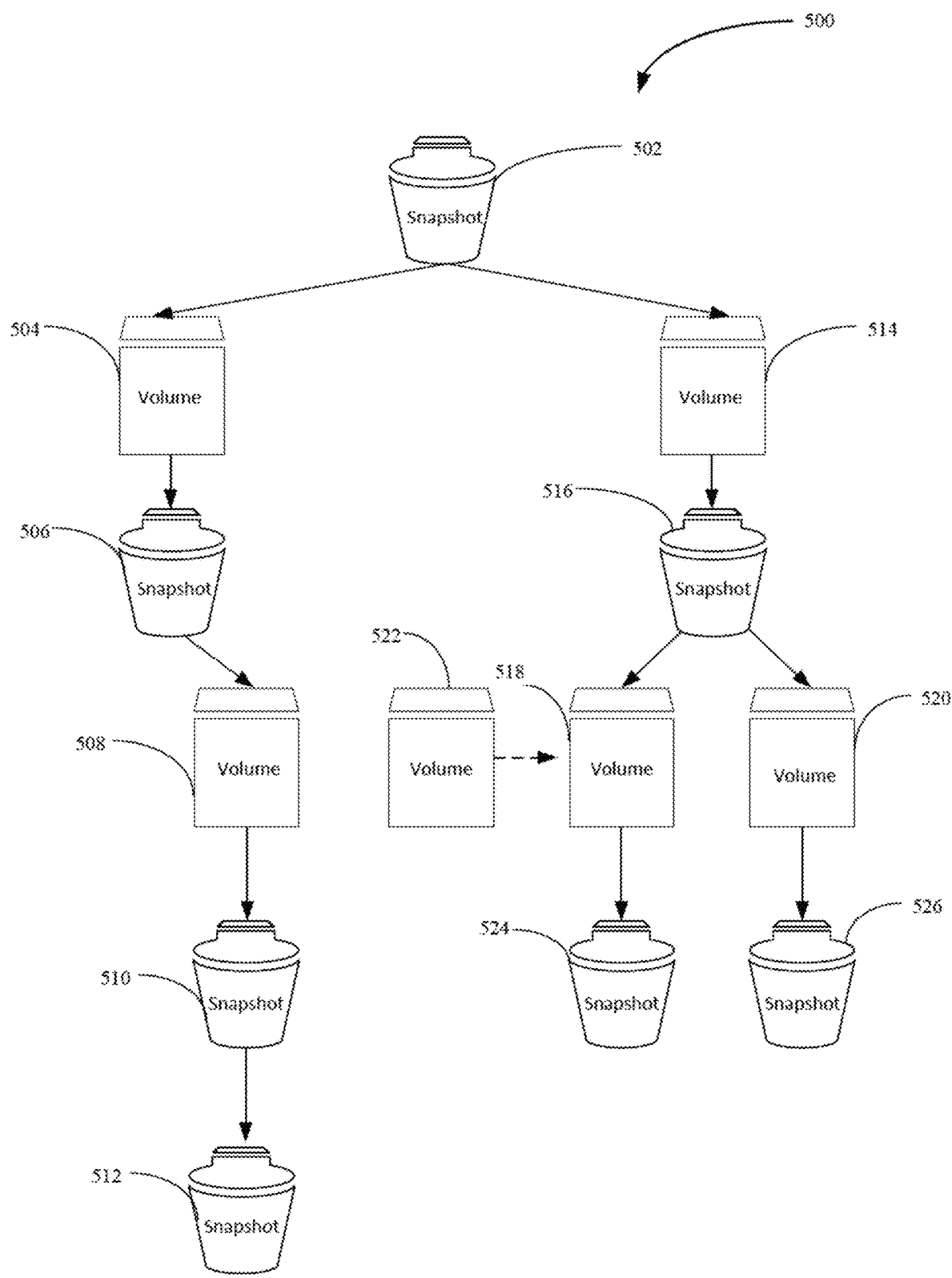

FIG. 3 illustrates an example process 300 for generation of a storage unit lineage graph ("graph" for brevity). The storage unit management system 200 or some other system or component of the cloud provider network 100 may execute the process 300. FIGS. 4-5 are block diagrams of illustrative lineages of storage units. FIGS. 3 and 4-5 will be discussed in parallel as the process described in FIG. 3 may be used to construct graph representations of the illustrative lineages depicted in FIGS. 4-5.

At block 302, graph generation may begin on-demand or in response to occurrence of an event. For example, graph generation may be initiated in response to a query (e.g., an API request) from a user or external service when a given tainted storage unit is known, to identify the set of related storage units which are also tainted. As another example, the storage unit management system 200 may implement scheduled graph generation (e.g., hourly, daily, weekly, monthly, yearly, etc.).

At block 304, metadata may be loaded (e.g., from metadata storage system 208 of FIG. 2) for a plurality of storage units. The metadata may be stored in temporary storage (e.g., a cache) located in a storage unit management system (e.g., storage unit management system 200 of FIG. 2). The plurality of storage units may include all storage units associated with an account, as described above. Additionally, or alternatively, the plurality of storage units may include a subset of storage units associated with an account. For example, in a non-limiting embodiment, storage units may be assigned a family ID on creation. The family ID may be assigned to a source volume, and added to storage units associated with that volume as they are created. For example, in some embodiments, snapshots of the volume, incremental snapshots of these snapshots, volumes restored from the snapshots or incremental snapshots, etc. may share the same family ID.

At block 306, a first storage unit may be represented by a first node of the graph. The first storage unit may be a source volume. For example, FIG. 4 depicts a lineage 400 beginning with a source volume 402 as a root node. The first storage unit may alternatively be a snapshot. FIG. 5 depicts a lineage 500 beginning with a snapshot 502 as a root node. In some embodiments, the first storage unit added to a graph may not necessarily end up as the root node of the graph. For example, a storage unit that is a snapshot of a source volume or snapshot, or a volume that is restored from a snapshot, may be the first node added to the graph. Metadata regarding a parent storage unit may later be analyzed as described in greater detail below, and a parent node to the first node may be added to the graph.

Additionally, or alternatively, the first storage unit may be identified by a user and/or an external service as tainted with potentially sensitive data. As discussed above, sensitive data may include malware, customer data, data exposing a computing instance to one or more vulnerabilities, personal data including personally identifiable information (PII), confidential information, classified information, data otherwise of interest, or some combination thereof. The first storage unit may be selected as such based on being identified as a tainted storage unit.

At block 308, metadata for the first storage unit may be analyzed. The metadata may include, but is not limited to, timestamps corresponding to a time of creation of a storage unit, timestamps corresponding to the occurrence of one or more events (scans, requests by users, requests from external services, etc.), unique storage block identifiers, relationship identifiers, other data, or any combination thereof. Relationship identifiers may include, but are not limited to, hierarchical relationship identifiers or family identifiers. As discussed above, a family identifier may indicate that storage units containing that family identifier are in the same lineage. Hierarchical relationship identifiers may include, for example, pointers to one or more parent storage units and/or pointers to one or more child storage units. Assignment of these identifiers may be added by storage unit management system 200. Additionally, or alternatively, assignment of identifiers may be performed by other components of cloud provider network 100.

At block 310, an edge may be added to the graph based at least in part on a relationship identifier from the storage unit metadata. A second node may also be added to the graph. The second node may represent a second storage unit identified by the relationship identifier. The added edge may connect the second node to the first node and represent the relationship between the storage units represented by the first and second nodes.

Referring back to FIG. 4, snapshot 404 may be created from volume 402. Volume 402 may contain or be assigned a relationship identifier referencing snapshot 404 as a child. For example, the metadata for volume 402 may contain a relationship identifier assigned at the creation of volume 402 identifying the storage unit it was created from. For example, volume 402 may have been created from another volume 403 (e.g., by cloning) Additionally, or alternatively, metadata for volume 402 may contain relationship identifiers to children of volume 402 assigned at the creation of those children (e.g., snapshot 404).

Snapshot 404 may contain or be assigned a relationship identifier indicating that volume 402 is a parent. Snapshot 404 may also contain a relationship identifier identifying volume 402 as a source volume. As discussed above, this identifier may be assigned at the creation of snapshot 404. With reference to FIG. 5, snapshot 502 may contain or be assigned a relationship identifier which identifies volume 504 and volume 514 as children. Additionally, or alternatively, both volume 504 and volume 514 may contain or be assigned relationship identifiers identifying snapshot 502 as a parent and/or as a source.

At block 312, additional nodes and edges may be added to the graph, based at least in part on additional relationship identifiers and additional storage units represented by the storage unit metadata. Depending upon the specific relationships and storage units represented by the storage unit metadata, additional child nodes may be added and/or additional parent nodes may be added.

With reference to FIG. 4, snapshot 406 may be created as an incremental snapshot of volume 402 with snapshot 404 as the parent snapshot. In some embodiments, snapshot 406 may be a duplicate of snapshot 404. This may mean that data blocks in volume 402 were not changed between the creation of snapshot 404 and snapshot 406. Snapshot 408 may be created as another incremental snapshot of volume 402 with snapshot 406 as a parent. Volume 410 may be created from snapshot 404, and snapshot 412 may be created from volume 410. In some embodiments, snapshot 412 may contain a relationship identifier identifying volume 410 as a parent, but not indicating a relationship to volume 402 or snapshot 404. In this example, because volume 410 is restored from snapshot 404 prior to snapshot 412 being created, snapshot 412 is not an incremental snapshot of 404 but rather a full snapshot. However, in some embodiments, snapshot 412 may contain a relationship identifier identifying volume 402 as a source, but not with a relationship identifier identifying volume 402 as a parent. Edges and nodes may be added to a graph corresponding to lineage 400 based on these relationships.

Referring to FIG. 5, volumes 504 and 514 may be created from snapshot 502. Snapshot 506 may be created from volume 504. Volume 508 may be created from snapshot 506. Snapshot 510 may be created from volume 508. Snapshot 512 may be created as an incremental snapshot of volume 508 with snapshot 510 as a parent.

Snapshot 516 may be created from volume 514. Volumes 518 and 520 may be created from snapshot 516. Snapshot 524 may be created from volume 518. Snapshot 526 may be created from volume 520. As discussed above, edges and nodes may be added to a graph corresponding to lineage 500 based on these relationships.

In some embodiments, volume 522 may be created from snapshot 516. It may be determined that volume 522 or storage units higher in the lineage (e.g., snapshot 516) are tainted by potentially sensitive data. Remedial action may be taken to correct this prior to creation of further storage units from volume 522. For example, potentially sensitive data could be removed from volume 522 prior to creating volume 518.

In some embodiments, tainted storage unit(s) can be updated to reduce access. For example, the tainted storage unit(s) can be quarantined, duplication of the tainted storage units can be prevented, links to the tainted storage unit(s) could be removed, the data within the tainted storage unit(s) could be overwritten, another method of reducing access could be implemented, or some combination thereof. Additionally, or alternatively, tainted storage blocks within the tainted storage units may be updated to reduce access, as discussed above. Additionally, or alternatively, sensitive data within the tainted storage unit may be overwritten (e.g., with zeros). In some embodiments, the sensitive data may be updated to reduce access, as described above. This would mitigate the spread of the potentially sensitive data to child storage units (e.g., snapshot 524).

Additional edges and nodes may be added until a stopping point is reached at block 314. A stopping point may be reached where the storage units represented by nodes of the graph have no pointers indicating additional child storage units or additional parent storage units. Additionally, or alternatively, a stopping point may be reached where storage units that would be represented by pending nodes (e.g., nodes not yet added to the graph) no longer share data blocks with the first node. For example, a stopping point may be reached where no data blocks are in common with the first node. A stopping point may also be reached where no data blocks identified as tainted are present in storage units associated with the pending nodes. Additionally, or alternatively, a stopping point may be reached where no storage units represented by pending nodes share a family identifier. For example, a stopping point may be reached where storage units represented by pending nodes no longer share a family identifier with the first node.

Additionally, or alternatively, in some embodiments, a stopping point may be reached when storage units represented by pending nodes no longer share particular tags. Tags may be included in the metadata for the storage unit. In a non-limiting embodiment, the tags may be environmental values (e.g., development, test, or production). In another non-limiting embodiment, the tags may relate to prior queries. For example, the tags may relate to prior scans for sensitive data. Additionally, or alternatively, tags may be chosen to facilitate user queries. For example, the tag may indicate why a scan was performed. The tags may be set by a user. The tags may also be set by a service or other entity. In some embodiments, storage units may have more than one tag. In some embodiments, some storage units may have tags and some storage units may not have tags. Of course, in some embodiments, no storage units may have tags.

Additionally, or alternatively, a stopping point may be reached where the storage units represented by the pending nodes fall outside of a time-range. For example, nodes may be added to the graph only for storage units created within a certain time range. The time range may be set by one or more entities including, but not limited to, a user, by an external service, by a storage unit management system (e.g., storage unit management system 200 of FIG. 2), etc.

Blocks 316, 318, and 320 are outlined with dashed lines to indicate that in some embodiments, these steps may not occur. At block 316, the storage unit management system 200 may monitor whether a storage unit lineage event has been detected. A storage unit lineage event may include, but is not limited to, addition of a storage unit, removal of a storage unit, request to update the graph, another type of event affecting the lineage, or some combination thereof. In some embodiments, storage unit management system 200 may be notified of restoration of volume or creation of snapshot or dismounting of volume (e.g., by control plane components 102 of FIG. 1).

At block 318, if a storage unit lineage event has been detected, the process 300 may proceed to block 320. Otherwise, the process 300 may return to block 316 to continue monitoring for occurrence of a storage unit lineage event.

At block 320, the graph may be updated in response to occurrence of the storage unit lineage event. The update may be made so that the graph reflects the current state of the storage unit lineage. For example, if a volume has been restored from a snapshot or a new snapshot has been created, then a new node and edge may be added to the graph as discussed in greater detail above. As another example, if a volume has been dismounted or a compute instance using a volume has been terminated, if access to a volume has been reduced, or if access to a snapshot has been reduced, then a node may be removed from the graph. Removal of a node can in some cases be accompanied by re-configuring an edge so that child nodes of the removed node are not orphaned (e.g., a child node of a removed node may be connected by an edge to a parent of the removed node).

Example Hardware Components for Storage Unit Management

Figure 6:
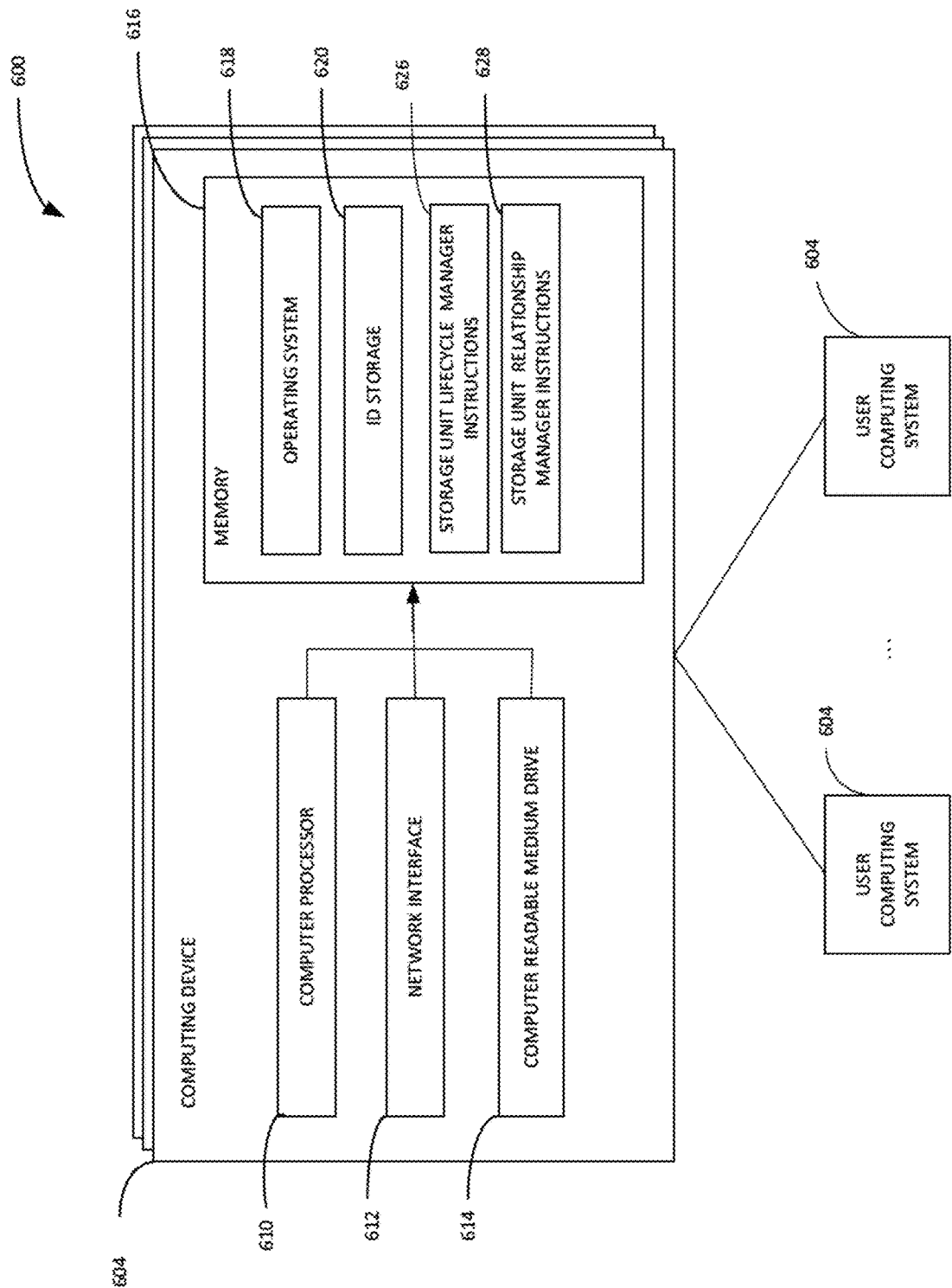
FIG. 6 is a block diagram of an illustrative computing device configured to implement features of a data tracking system, according to some embodiments.

FIG. 6 illustrates various components of an example computing device 604 configured to implement various functionality of the storage unit management system 200. As shown, a storage unit management system 200 may include one or more of such computing devices 604. In some embodiments, each individual computing device 604 is configured to provide all the features of storage unit management system 200. In some embodiments, a particular computing device 604 provides only a subset of features of storage unit management system 200. For example, one computing device 604 or subset of computing devices may implement the features of the storage unit lifecycle manager 210, a second computing device 604 or subset of computing devices may implement the features of storage unit relationship manager 212, etc.

In some embodiments, as shown, the computing device 604 may include: one or more computer processors 610, such as physical central processing units ("CPUs"); one or more network interfaces 612, such as a network interface cards ("NICs"); one or more computer readable medium drives 614, such as a hard disk drives ("HDDs"), solid state drives ("SSDs"), flash drives, and/or other persistent non-transitory computer-readable media; and one or more computer readable memories 616, such as random access memory ("RAM") and/or other volatile non-transitory computer-readable media.

The computer readable memory 616 may include computer program instructions that one or more computer processors 610 execute in order to implement one or more embodiments. The computer readable memory 616 can store an operating system 618 that provides computer program instructions for use by the computer processor(s) 610 in the general administration and operation of the computing device 604. In some embodiments, the computer readable memory 616 can further include computer program instructions and other information for implementing aspects of the present disclosure. For example, in one embodiment, the computer-readable memory 616 may include ID storage 620 for storing identifiers associated with one or more storage units (e.g., storage unit identifiers, unique data block identifiers, relationship identifiers, timestamps, etc.). The computer-readable memory 616 may in some embodiments include one or more of: storage unit lifecycle manager instructions 626 for implementing features of storage unit lifecycle manager 210, storage unit relationship manager instructions 628 for implementing features of the storage unit relationship manager 212, etc.

FIG. 6 further illustrates example data flows and interactions between the storage unit management system 200 and one or more user computing systems computing device 604 configured to manage storage units via storage unit management system 200. When processes 300, 700, 800, 900, or 1000 are initiated, a corresponding set of executable program instructions stored on a computer readable medium drive 606 may be loaded into computer readable memory 616 and executed by one or more computer processors 610. In some embodiments, the processes 300, 700, 800, 900, or 1000 or portions thereof—may be implemented on multiple computing devices and/or multiple processors, serially or in parallel.

Example Implementations of Tracking Sensitive Data

Figure 7:
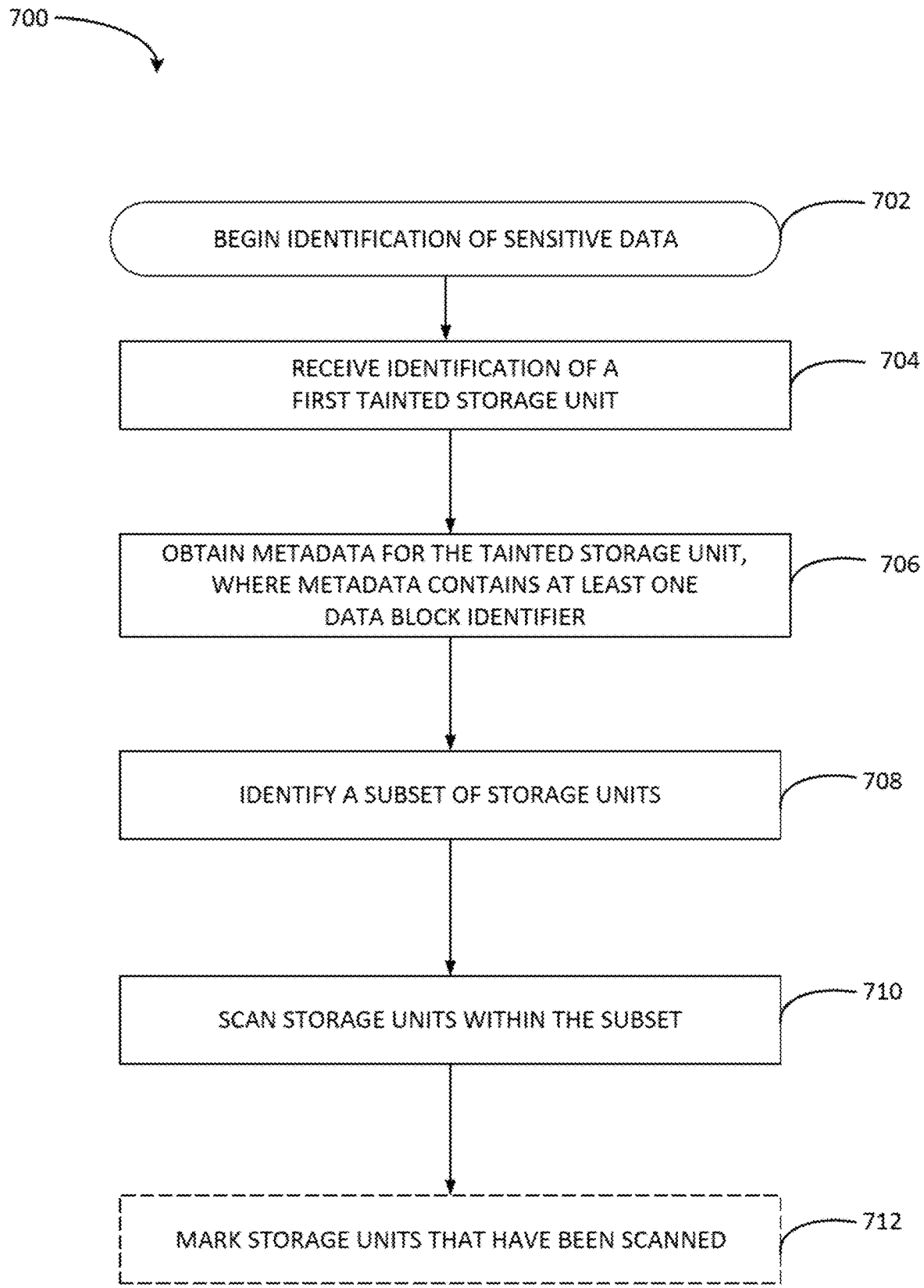
FIG. 7 is a flow diagram of an illustrative process of tracking sensitive data in network-based computing resources using a graph associated with one or more storage units.
Figure 8:
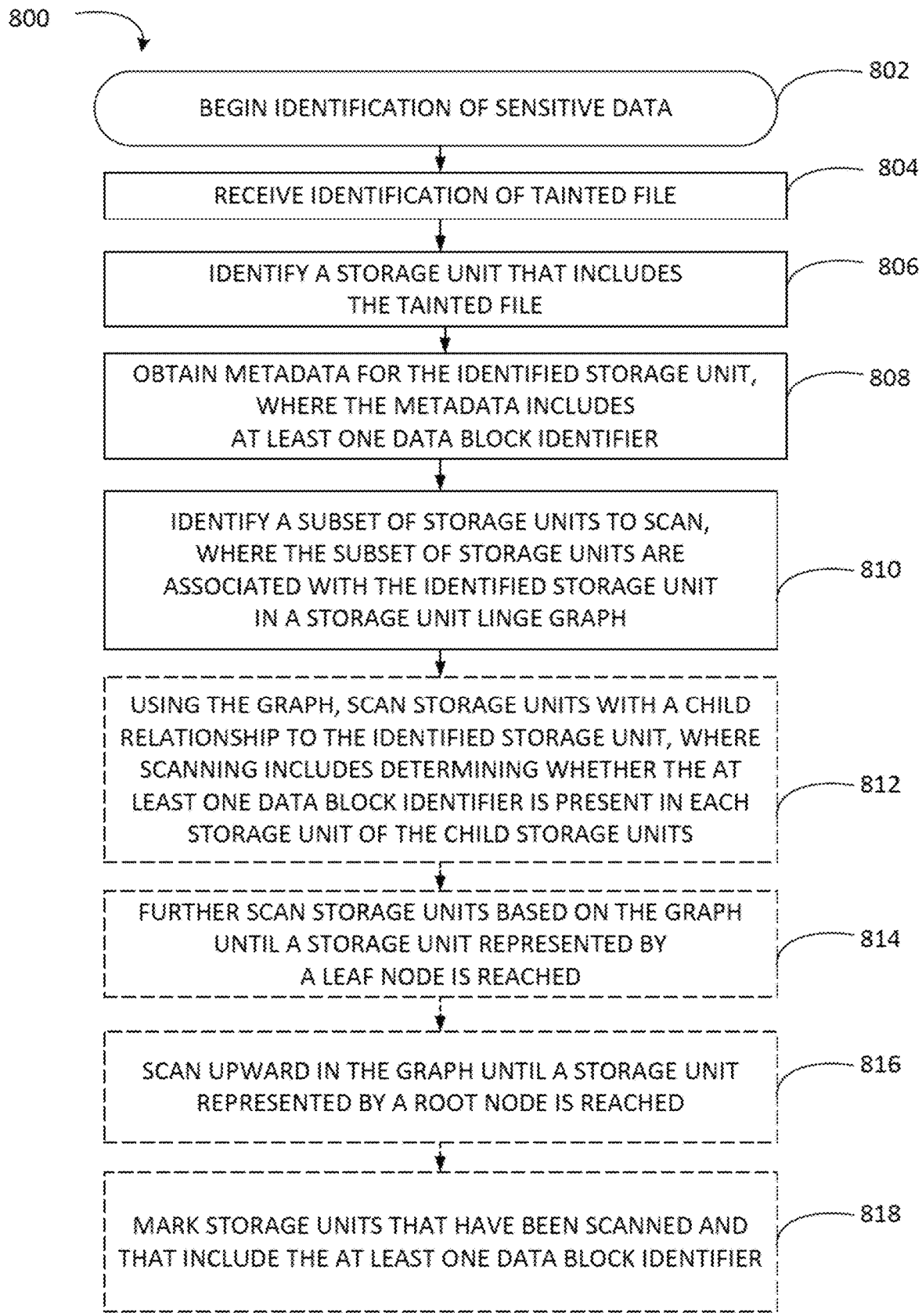
FIG. 8 is a flow diagram of an illustrative process of tracking a specific file in network-based computing resources using a graph associated with one or more storage units.

FIG. 7 is a flow diagram of an illustrative process 700 of tracking the spread of sensitive data in network-based computing resources through tainted storage units. FIG. 8 is a flow diagram of an illustrative process 800 of tracking a specific file of sensitive data in network-based computing resources using a graph representing one or more storage units and relationships between the storage units. FIG. 7 may be considered a general process of identifying tainted storage units, and FIG. 8 is a specific implementation of identifying tainted storage units using graphs. Thus, FIGS. 7 and 8 will be discussed in parallel to show similarities and differences between the processes. However, it will be appreciated the processes illustrated by FIG. 7 and FIG. 8 will not be executed in parallel.

Process 700 begins at block 702. The storage unit management system 200 or some other system or component of the cloud provider network 100 may execute the process 700. At block 704, identification of a tainted storage unit is received. Identification can be received from a user. Additionally, or alternatively, identification may be received from an external service. For example, in a non-limiting embodiment, identification data identifying a tainted storage unit may be received from a malware detection service. identification data identifying a tainted storage unit may also be received from other services, such as a vulnerability detection service. In some embodiments, a name or other identifier of more than one tainted storage unit may be received.

With reference to FIG. 8, process 800 begins at block 802. The storage unit management system 200 or some other system or component of the cloud provider network 100 may execute the process 800. At block 804, identification of a tainted file (e.g., a file name of the tainted file) is received. The tainted file may be associated with the sensitive data. Identification of the name of a tainted file may can be received from a user. Additionally, or alternatively, identification may be received from an external service (e.g., a malware detection service, a vulnerability detection service, etc.). In some embodiments, the name or other identifier of more than one tainted file may be received.

At block 806, at least one storage unit may be identified that includes the tainted file. The storage unit management system 200 may receive an indication of a particular storage unit that includes the tainted file (e.g., based on a malware scan performed by a compute instance on its volume, based on a customer report, etc.).

In some embodiments, the storage unit management system 200 may begin analyzing storage units to identify a storage unit (if any) that includes a tainted file. For example, names or paths (e.g., file system directory paths) of tainted files may be received as described above or accessed from some other source. The tainted files might be files known to contain sensitive data, such as malware, confidential data, personally-identifiable information (PII), data exposing computing resources to vulnerabilities, or the other sensitive data. The names or paths of tainted files may be in the form of a list. The list may be updated regularly as knowledge relating to names or paths of files containing sensitive data is gained. For example, some of the names or paths of tainted files may be files known to contain malware. The list may be updated as knowledge of what constitutes malware are changed. In some embodiments, a user can provide access to this data.

Additionally, or alternatively, a service may be used to access a list of names or paths of tainted files. In some embodiments, the service may access updated names or paths of tainted files as they are added to a list. The list may be generated by a user and contain a list of files containing data that they would like removed or tracked and provide access to this list. However, in some embodiments, the service may generate the list. For example, the service may be a malware detection service. Other services may also be used. For example, a vulnerability detection service can access a list of names of files containing known vulnerabilities. This list can be updated as knowledge relating to what constitutes a vulnerability are updated. The service used to access the list may illustratively be referred to as a tainted file information service below.

To determine whether a tainted file is present within a storage unit, data blocks that store the data of the tainted file may be identified. In some embodiments, a first storage block within a tainted file may be identified. In other embodiments, the first storage block may entirely contain the tainted file. A list of data blocks may be provided in response to an analysis of file system data for a storage unit. The analysis may be conducted by calling a service or executing a function and specifying the name of a tainted file and/or the file path of a tainted file. In response, a list of unique block identifiers in a storage unit may be provided where the unique block identifiers correspond to data blocks fully containing the tainted file(s) within the list of names of tainted files discussed above. If the tainted file identified by the name or path is not present in the storage unit, no unique block identifiers may be returned. In some embodiments, one data block may fully contain the file. In other embodiments, multiple storage blocks may fully contain the file. Additionally, or alternatively, data locations (e.g., indices) corresponding to the identified data block(s) may be identified. For example, in some embodiments, storage units may be searched until a tainted file is found. Once the file is found, the data location associated with the file can be used to find the locations of the data blocks identified to contain the file.

In some embodiments the data block identification functions described herein may be provided by a service (e.g., an API) called identify data block(s) containing the tainted file. Of course, a service does not need to be used to carry out these functions. In some embodiments, the service used to identify data block(s) may be called subsequent to the tainted file information service, described above. Accordingly, it may be referred to as a block identification service below.

If a storage unit is a volume, analysis of the storage unit for the presence of a tainted file may be implemented by finding the file and its data blocks on the volume. For example, the presence of a tainted file may be determined by mapping the data locations of the data blocks known to tainted file data to the data blocks within the volume. If the storage unit is a snapshot or incremental snapshot, the analysis may be preceded by creating a volume from the snapshot or incremental snapshot. The storage unit may be mounted to allow access to the data within the storage unit. The data can be accessed to determine whether the storage units contain the identified data block(s) using the mapping described above. In some embodiments, a service may be called to mount the storage units. In some embodiments the service to mount the storage unit may be called by the block identification service described above. This service may illustratively be referred to as the snapshot analysis service below.

The functions described above, with reference to block 806, are in some embodiments carried out by a tainted file information service, block identification service, or snapshot analysis service. The services may be provided via application programming interfaces to perform operations and functions. For example, there may be a function to return data block identifiers from storage units given a name or file path of a tainted file. Additionally, or alternatively, there may be a function to return a list of unique block identifiers present in a storage unit given a list of identifiers of tainted data blocks. A person of skill in the art would understand that these services are illustrative only, and are not required. For example, a different service may be used, a single service may be used, more than three services may be used, etc.

At block 808 metadata is obtained for the identified storage unit. The identified storage unit may be the first tainted storage unit identified within storage units of a cloud provider network (e.g., cloud provider network 100 of FIG. 1). The metadata may contain at least one unique data block identifier corresponding to a data block containing sensitive data. The unique data block identifier may have been identified prior to identifying the storage unit, as described above with reference to block 806.

Referring back to FIG. 7, at block 706, metadata may be obtained for the storage unit (e.g., from metadata storage system 208 of FIG. 2). The metadata may contain at least one unique data block identifier. The unique data block identifier may correspond to a data block containing sensitive data. In some embodiments, a service may be called to identify data blocks containing sensitive data. This service may be, but is not limited to a malware detection service, a vulnerability detection service, a privacy leak detection service, another service, etc.

At block 708, a candidate subset (also referred to as "subset" for brevity) of storage units may be identified. The subset of storage units may be identified based on user accounts. For example, the subset of storage units may be from one account. Additionally, or alternatively, the subset of storage units may be from multiple accounts associated with one user. The subset of storage units may also be identified based on family IDs, as discussed above. In some embodiments, the subset of storage units may be identified based on time stamps. For example, in a non-limiting embodiment, a subset of storage units may be selected whose metadata contains time stamps that fall within a time range. Additionally, or alternatively, referring to FIG. 8 at block 810, a subset of storage units may also be identified where the storage units are represented by a graph that includes the identified storage unit. For example, the subset of storage units may be derived using a graph built using process 300.

At block 710, storage units within the subset may be scanned. A scan may search for sensitive data or data structures containing sensitive data (e.g., files, data blocks, or storage units). One or more scans may be used to query for all tainted-storage units given a first tainted storage unit (e.g., determined from block 706 above). Additionally, or alternatively, scans may be limited to the subset of storage units identified in block 708. Scan results may be used to take remedial action relating to the storage units identified as tainted during the scan. Remedial actions could include, but are not limited to deleting, tagging (e.g., adding an identifier to the metadata), archiving, stopping use, another action, or some combination thereof of tainted snapshots. More than one scan may be requested. Multiple types of scans could be performed simultaneously. For example, scans for identifying taint relating to different types of sensitive data may be performed at the same time. Each scan may return a list of tainted storage units corresponding to the type of sensitive data. Additionally, or alternatively, the scan(s) may return a single list of tainted storage units. The single list may contain identifiers for what types of sensitive data are present in each tainted storage unit on the list. Different services (e.g., APIs) may be used to carry out different scans. Of course, services do not need to be used.

The scan(s) may first identify potentially tainted storage units based on relationships between the storage units. For example, the storage units may be scanned based on hierarchical relationships between storage units within the subset. The scan(s) may then evaluate whether the storage units with a child relationship share at least one unique data block identifier with the at least one storage unit. If so, the child storage units may be considered to be tainted, or may be marked for further evaluation as potentially tainted. For example, the scan(s) may identify a child storage unit as potentially tainted if data blocks are shared with a tainted storage unit. Using information relating to tainted storage blocks, the scan(s) may determine that the common data blocks are not tainted, and therefore the child storage unit is untainted. However, using information relating to tainted storage blocks, the scan(s) may determine that at least one of the common data blocks is a tainted data block, and therefore the child storage unit is tainted.

Additionally, or alternatively the scan may evaluate whether the storage units with a parent relationship share at least one unique data block identifier with the at least one storage unit. If so, the child storage units may be considered to be tainted, or may be marked for further evaluation as potentially tainted, as described above. A data block corresponding to the unique block identifier may be stored in the same location in each storage unit to which the unique block identifier is assigned. To determine whether a unique block identifier is shared, the scan may compare the metadata of the storage units to see whether the unique data block identifier is present. Additionally, or alternatively, the scan may look at whether the data block corresponding to the unique block identifier is present at a particular data location within the storage unit. Additionally, or alternatively, the scan may provide a checksum of the contents of the data block corresponding to the unique block identifier.

With reference to FIG. 8 at block 812, using the graph referenced in block 810, storage units may be scanned. The scan(s) may be conducted as described above with reference to FIG. 7 at block 710 to evaluate whether the storage units are tainted.

Storage units can be scanned that have a child relationship to the identified storage unit. In some embodiments, a service (e.g., an API) may be used to enable a scan. The service may build the graph as the result of a request for the scan. The service may also provide notification that a graph is not ready for the scan. This notification can be provided to a user, a separate service for scanning storage units, etc. Once the graph is ready, a service may be called to return a list of tainted storage units. Different services may carry out different functions. Of course, a service does not need to be used to carry out these functions.

As discussed above with reference to FIG. 7, the at least one unique data block identifier may be associated with the sensitive data (e.g., the tainted file referenced in blocks 804 and 806). As indicated by block 814 and block 816, the scan may continue until the end of the graph is reached. Additionally, or alternatively, the scan may continue until the child or parent nodes no longer share unique data block identifiers with the identified storage unit. Additionally, or alternatively, the scan may continue until the child or parent nodes no longer share unique data block identifiers containing the sensitive data (e.g., name of a tainted file(s)).

The graph may be updated to reflect that nodes are representing storage units identified as tainted. In some embodiments, nodes that represent storage units determined to contain unique block identifiers in common with the identified storage units may be marked as tainted. For example, the metadata associated with the nodes may be assigned an identifier to indicate that the storage unit represented by the node is tainted. In some embodiments, nodes that represent storage units determined to contain unique data block identifiers associated with one or more tainted data blocks are marked as tainted, and other nodes are marked as untainted. Of course, untainted nodes may not be marked.

In some embodiments, a visual representation of the graph may be generated. Nodes that represent tainted storage units may be represented by a different color. For example, in a non-limiting embodiment, nodes that represent tainted storage units may be represented in red and nodes that represent other storage units may be represented in blue.

With reference to FIG. 7 at block 712, storage units that have been scanned may be assigned a scan identifier. For example, a scan identifier may be added to the metadata of a storage unit at the time the scan is conducted. Additionally, or alternatively, the scan identifiers may be stored in a scan history table, which also stores a list of scan results. In some embodiments, there may be separate tables for scan identifiers and scan results. The scan identifier may also be grouped with one or more scan identifiers using a tag. For example, the tag may be set by a user. The user may use the tag to query information relating to the search. The tag may also be stored in the tables described above.

Storage units determined to contain sensitive data may be assigned a taint identifier to indicate they are tainted. This identifier may be stored with the metadata for the storage units. Additionally, or alternatively, this identifier may be stored in tables described above. As an example, with reference to FIG. 8 at block 818, the scanned storage units may be assigned a taint identifier if the scan(s) determined that they contain a unique data block identifier that has been associated with a tainted file name.

In some embodiments, a list containing tainted storage units may be outputted. For example, a list of storage units identified as tainted may be output at the end of processes 700 or 800. The list may be provided to a user. Additionally, or alternatively, the list may be provided to a service. For example, the list may be provided to a malware detection service, a vulnerability detection service, etc. In some embodiments, the list may provide a taint severity indicator in addition to identification of the tainted storage units.

Example Remediation to Identification of Sensitive Data

Figure 9:
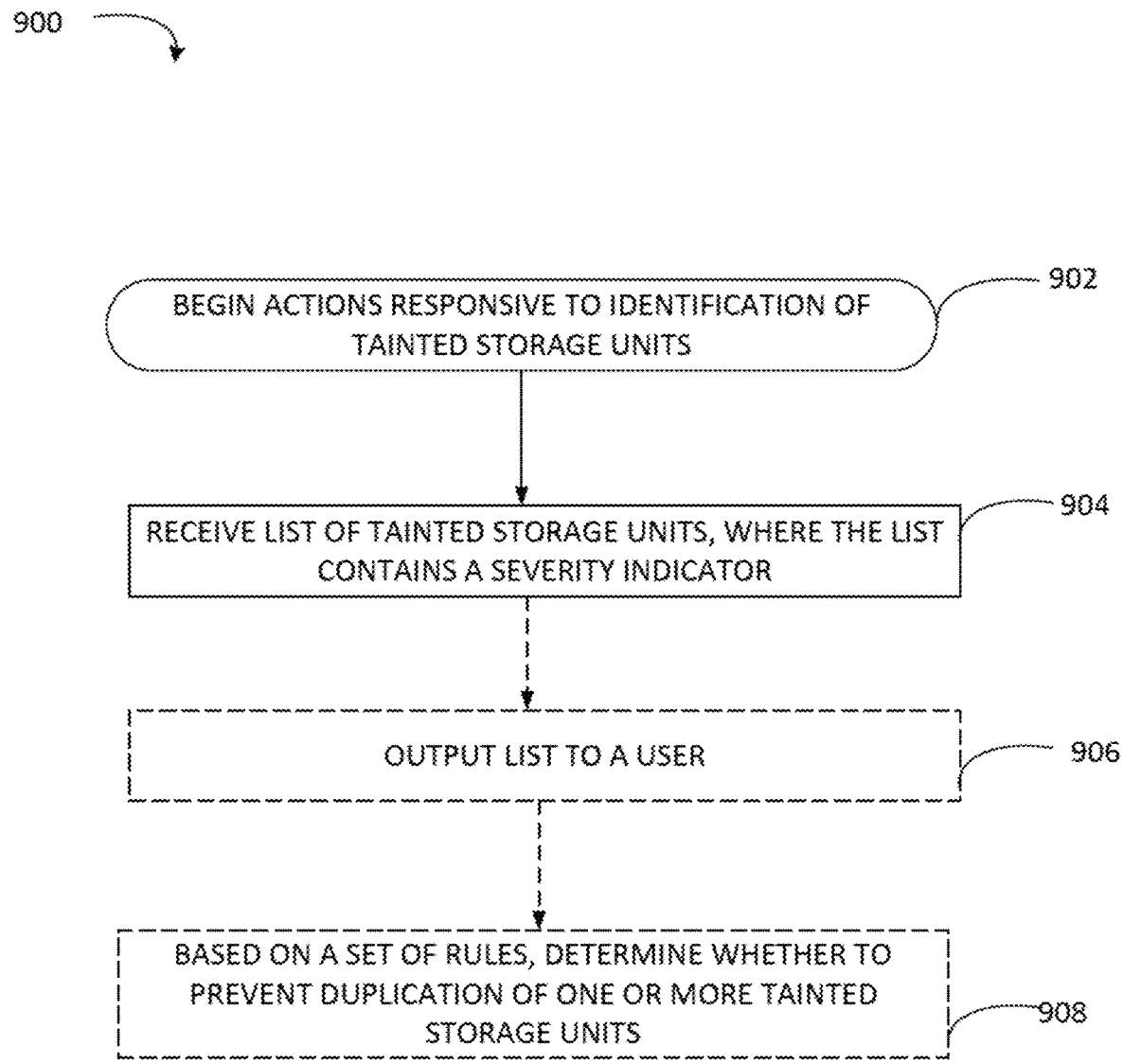
FIG. 9 is a flow diagram of illustrative actions that may be taken in response to identifying storage units containing sensitive data.

FIG. 9 depicts an illustrative process 900 of remedial actions that may be taken in response to identifying storage units containing sensitive data. Process 900 begins at block 902. At block 904, a list of tainted storage units may be received. The list may be generated from one or more scans, such as those described in FIGS. 7-8 above. The list may be the consolidated results from the one or more scans. Of course, a list may be generated for each scan conducted.

The tainted storage units may contain one or more severity indicators. The severity indicators may indicate the amount of sensitive data present within the storage unit. The severity indicators may be derived from the results of one or more scans. Additionally, or alternatively, a severity indicator may be applied for each scan. The severity indicator(s) may be stored in tables(s), such as those mentioned above with reference to FIG. 7 at block 712.

At block 906, the list may be output to a user. The user may be the owner of an account. For example, the list may be generated from one or more scans of an account and subsequently provided to the owner of the account. Additionally, or alternatively, the scans may have been conducted on one or more accounts and the user may be associated with all of those accounts.

At block 908, duplication of one or more tainted storage units may be prevented based on a set of rules. For example, in a non-limiting embodiment, duplication of tainted storage units with a "high" severity indicator may be prevented. In another embodiment, duplication of tainted storage units may be prevented based on the type of taint identified (e.g., sensitive data, malware, vulnerabilities, etc.). As an example, in a non-limiting embodiment, a list of tainted storage units may be obtained from a scan relating to identifying malware-related taint. Another list may be obtained from a scan related to identifying a particular piece of data of interest to a user. Duplication may be prevented for the files identified in the scan to identify malware-related taint and not for the files identified in the other scan.

Figure 10:
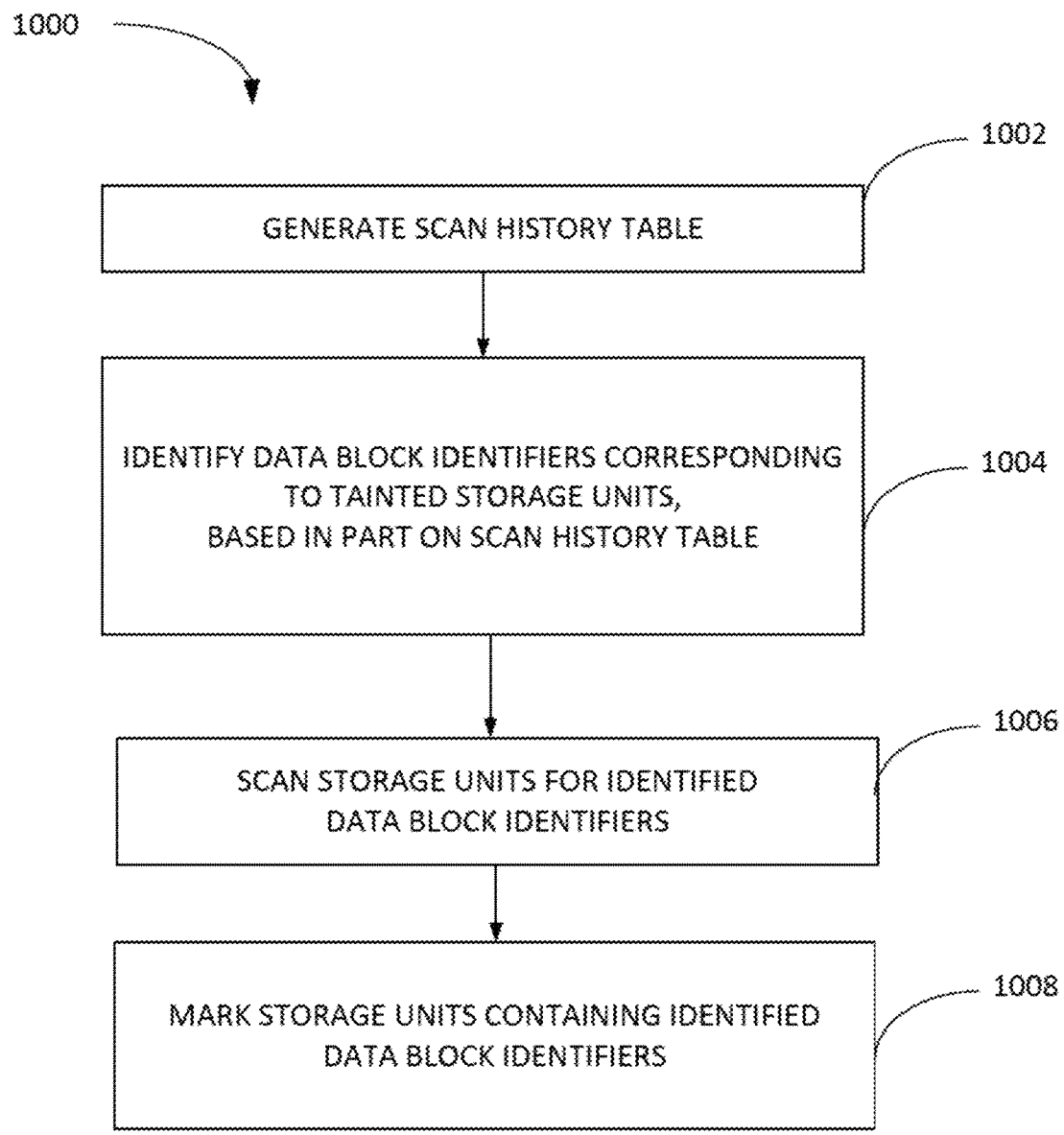
FIG. 10 is an illustrative diagram of stored taint identifier information for a storage unit over time.
Figure 11:
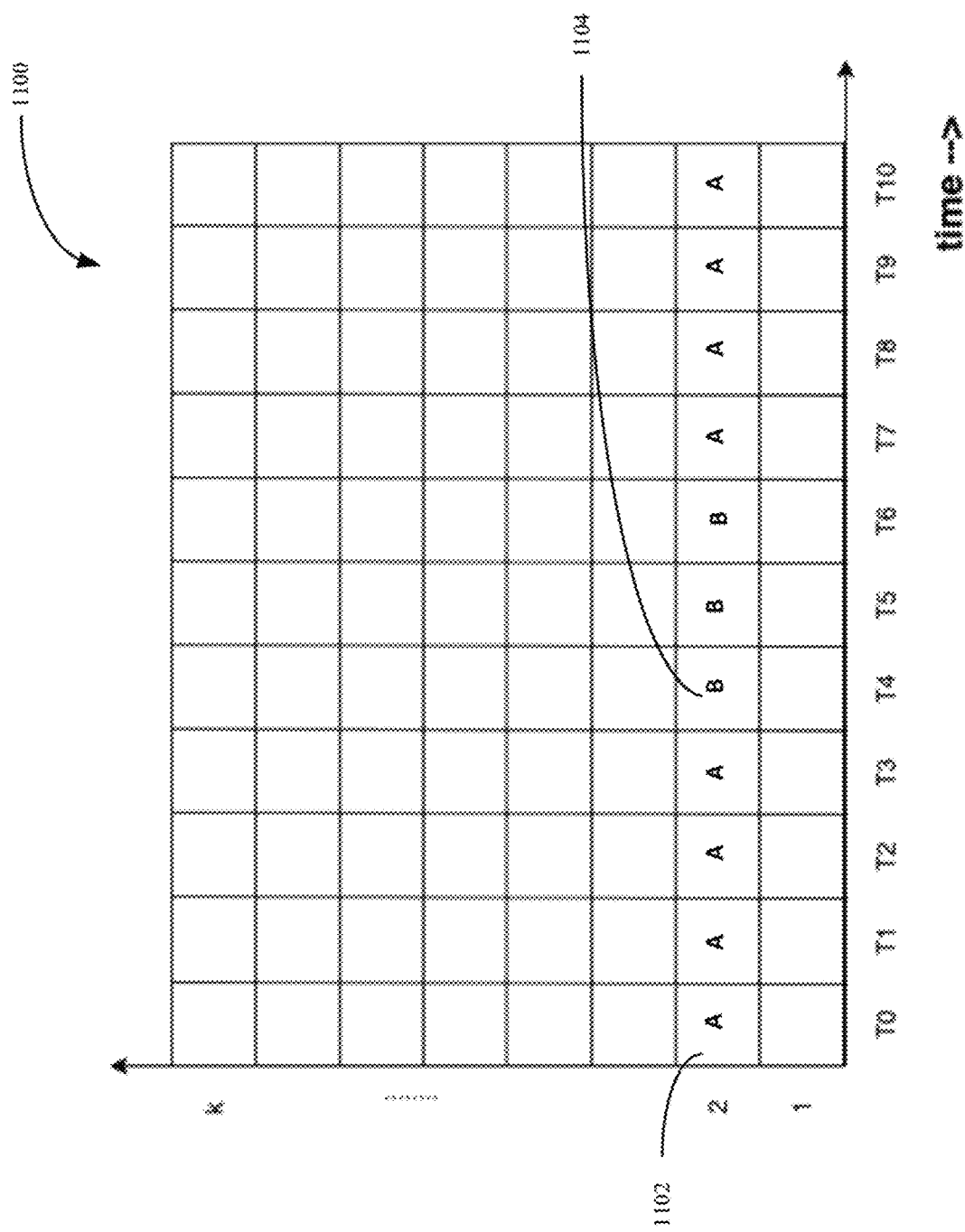
FIG. 11 is a flow diagram of an illustrative process for adding identifiers associated with storage units in response to identification of storage units as tainted.

FIG. 10 is a flow diagram of an illustrative process 1000 for adding identifiers associated with storage units in response to identification of storage units as tainted. FIG. 11 is an illustrative diagram 1100 of stored taint identifier information for a storage unit over time. FIGS. 10-11 will be discussed in parallel at least because the diagram depicted in FIG. 11 may represent the result of the process 1000 illustrated in FIG. 10.

At block 1002, a scan history table may be generated. The scan history table may identify in individual storage units their taint identification with corresponding with time entries. For example, with reference to FIG. 11, the scan history table may correspond to table 1100, according to some embodiments. In the example scan history table 1100, individual storage units have rows and their taint identification corresponding with time entry columns. The columns may be ordered. For example, the columns corresponding to the earliest time entry may be on the left and columns corresponding to later time entries may be added on the right. Of course, a different type of ordering or no ordering may be used within the rows. The marker 1102 may represent that a storage unit was identified as tainted at time 0. The marker may be a text tag. Additionally, the marker may be represented by a color or pattern. For example, in some embodiments, a red marker may indicate that a storage unit was identified as tainted, and a blue marker may indicate that a storage unit was not identified as tainted.

The time entries on the x-axis may represent scheduled scans or scheduled updates. In some embodiments, the time entries may be taken at regular intervals. Additionally, or alternatively, the time entries may be taken at random intervals. For example, the time entries may correspond to events that trigger a scan for tainted storage units, as described above.

Referring back to FIG. 10 at block 1004, the past identification of a storage unit as tainted may be used to identify corresponding sensitive data block identifiers. At block 1006, additional scans may be conducted on storage units to identify storage units with these data block identifiers. At block 1008, these storage units may also be marked as tainted.

What is considered sensitive may vary over time, so updates may occasionally be performed to re-classify a storage unit previously identified as tainted and/or to classify new storage units as tainted. For example, understanding of what constitutes data that should be kept private might be updated. It may be determined that certain data is no longer needs to be kept private and thus is no longer sensitive. The opposite may also occur, it may be determined that additional data needs to be kept private and classified as sensitive. In some embodiments, it may be determined that data previously classified as malware is no longer considered to be malware. Additionally, or alternatively, more data may be classified as malware. In some embodiments, it may be determined that data previously classified as a vulnerability is no longer considered to be a vulnerability. Additionally, or alternatively, more data may be classified as vulnerabilities. After such determinations, storage units may need to be reclassified as tainted or untainted.

The classification could be updated for each time entry, on request of a user, on request of a service, at scheduled time intervals, etc. With reference to the embodiment depicted in FIG. 11, as discussed above, marker 1102 may represent that a storage unit was identified as tainted. Marker 1104 may represent that the storage unit was reclassified as untainted at time T4. For example, at T4, a determination may be made that the data resulting in the storage unit's identification as tainted is no longer considered sensitive. The data may no longer be considered sensitive, as discussed in more detail above.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a data store storing storage unit metadata regarding a plurality of storage units, wherein a first subset of the plurality of storage units comprises data volumes of computing instances, and wherein a second subset of the plurality of storage units comprises snapshots of data volumes of computing instances; and a computing device in communication with the data store and programmed by executable instructions to at least:

receive a notification identifying a first tainted storage unit of the plurality of storage units;

identify a candidate subset of the plurality of storage units based on a storage unit lineage graph that represents lineage relationships among the plurality of storage units, wherein the candidate subset represents a search space for tainted storage units, wherein a first lineage relationship represents a potential of data being shared between data stored in a storage unit of the candidate subset and data of a first tainted storage unit, and wherein the first lineage relationship corresponds to one of: the first tainted storage unit being a first snapshot of a first data volume, or the first tainted storage unit being a second volume restored from a second snapshot;

identify a second tainted storage unit of the candidate subset based on the second tainted storage unit having a storage block in common with the first tainted storage unit; and execute a remedial action with respect to the second tainted storage unit.

2. The system of claim 1, wherein the computing device is further programmed to:

receive a name of a tainted file;

identify, in the first tainted storage unit, at least one data block associated with the tainted file; and determine that the second tainted storage unit comprises the at least one data block associated with the tainted file.

3. The system of claim 1, wherein the computing device is further programmed to prevent duplication of storage units identified as tainted by setting rules associated with tainted storage units.

4. The system of claim 1, wherein the computing device is further programmed to generate a severity indicator for the first tainted storage unit, wherein the severity indicator is added to the second tainted storage unit subsequent to identification of the second tainted storage unit, and wherein rules relating to duplication of storage units are based at least in part on the severity indicator.

5. A computer-implemented method comprising:

under control of a computing system comprising one or more computing devices and configured to execute specific instructions:

obtaining identification data regarding a first tainted storage unit of a plurality of storage units, wherein a first subset of the plurality of storage units comprises data volumes of computing instances, and wherein a second subset of the plurality of storage units comprises snapshots of data volumes of computing instances;

identifying a candidate subset of the plurality of storage units based on each storage unit of the candidate subset having a lineage relationship to the first tainted storage unit, wherein the candidate subset represents a search space for tainted storage units, and wherein the lineage relationship to the first tainted storage unit represents a potential of data being shared between a storage unit of the candidate subset and the first tainted storage unit;

identifying a storage unit of the candidate subset for further evaluation based on the storage unit having a storage block in common with the first tainted storage unit;

determining that the tainted storage unit is a second tainted storage unit; and executing a remedial action with respect to the second tainted storage unit.

6. The computer-implemented method of claim 5, wherein executing the remedial action comprises at least one of: updating the second tainted storage unit, updating the storage block in common with the first tainted storage unit, or generating a notification regarding the second tainted storage unit.

7. The computer-implemented method of claim 5, wherein identifying the candidate subset comprises using a lineage graph representing parent/child relationships between storage units of the plurality of storage units.

8. The computer-implemented method of claim 5, wherein identifying the candidate subset comprises using a family identifier, wherein the family identifier is shared between storage units with lineage relationships.

9. The computer-implemented method of claim 5, further comprising:

receiving a query, via an application programming interface (API) from at least one of a user or a service, identify storage units related to the first tainted storage unit for further evaluation.

10. The computer-implemented method of claim 5, further comprising identifying a tainted storage block within the first tainted storage unit based at least in part on analysis of one or more files within the first tainted storage unit.

11. The computer-implemented method of claim 10, wherein determining that the storage unit is the second tainted storage unit comprises determining that the second tainted storage unit comprises the tainted storage block.

12. The computer-implemented method of claim 5, further comprising:

determining a plurality of storage units for further evaluation from the candidate subset based on whether each storage unit of the candidate subset has a storage block in common with the first tainted storage unit;

accessing identification of a tainted storage block within the first tainted storage unit; and determining a tainted storage unit from the plurality of storage units based on the tainted storage unit having the tainted storage block in common with the first tainted storage unit.

13. The computer-implemented method of claim 5, further comprising:

determining an untainted storage unit from the candidate subset based on the untainted storage unit having no storage blocks in common with the first tainted storage unit.

14. The computer-implemented method of claim 5, further comprising:

determining a plurality of storage units for further evaluation from the candidate subset, based on whether each storage unit of the candidate subset has a storage block in common with the first tainted storage unit;

accessing identification of untainted storage blocks within the first tainted storage unit; and determining an untainted storage unit from the plurality of storage units based on the untainted storage unit having only untainted storage blocks in common with the first tainted storage unit.

15. A system comprising:
a computer-readable memory storing executable instructions; and
a computing device in communication with the computer-readable memory and programmed by the executable instructions to at least:
   obtain identification data regarding a first tainted storage unit of a plurality of storage units, wherein a first subset of the plurality of storage units comprises data volumes of computing instances, and wherein a second subset of the plurality of storage units comprises snapshots of data volumes of computing instances;
   identify a candidate subset of the plurality of storage units based on each storage unit of the candidate subset having a lineage relationship to the first tainted storage unit, wherein the candidate subset represents a search space for potentially tainted storage units, and wherein the lineage relationship to the first tainted storage unit represents a potential of data being shared between a storage unit of the candidate subset and the first tainted storage unit;
   identify a storage unit of the candidate subset for further evaluation based on the storage unit having a storage block in common with the first tainted storage unit;
   determine that the storage unit is a second tainted storage unit; and
   execute a remedial action with respect to the second tainted storage unit.

16. The system of claim 15, wherein the second tainted storage unit is included in the candidate subset of the plurality of storage units based on a time of creation of the second tainted storage unit.

17. The system of claim 15, wherein the second tainted storage unit is included in the candidate subset of the plurality of storage units based on a user account associated with the second tainted storage unit.

18. The system of claim 15, wherein the computing device is further programmed by the executable instructions to:
   identify a tainted storage block within the first tainted storage unit based at least in part on analysis of one or more files within the first tainted storage unit; and
   wherein the storage unit is determined to be the second tainted storage unit based on the storage unit comprising the tainted storage block.

19. The system of claim 15, wherein the computing device is further programmed by the executable instructions to:
   determine an untainted storage unit from the candidate subset based on the untainted storage unit having no storage blocks in common with the first tainted storage unit.

20. The system of claim 15, wherein the computing device is further programmed by the executable instructions to:
   generate, for each storage unit of the candidate subset, a corresponding taint identifier indicating the storage unit comprises sensitive data;
   add the taint identifiers as entries in a table, wherein a location of an entry in the table indicates: the sensitive data tainting a corresponding storage unit, the corresponding storage unit to which the taint identifier was added, and when the taint identifier was added; and
   update a first taint identifier associated with a first candidate storage unit of the candidate subset based on a change in classification of the sensitive data.

* * * * *